United States Patent
Watabe

(10) Patent No.: US 11,706,363 B2
(45) Date of Patent: Jul. 18, 2023

(54) IMAGE PROCESSING APPARATUS AND IMAGE PROCESSING METHOD FOR INSPECTING PRESENCE/ABSENCE OF A DEFECT IN A PRINT PRODUCT

(71) Applicant: CANON KABUSHIKI KAISHA, Tokyo (JP)

(72) Inventor: Hiroki Watabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/507,612

(22) Filed: Oct. 21, 2021

(65) Prior Publication Data
US 2022/0150375 A1   May 12, 2022

(30) Foreign Application Priority Data
Nov. 9, 2020   (JP) .................................. 2020-186563

(51) Int. Cl.
*H04N 1/00*   (2006.01)
*G06T 7/00*   (2017.01)

(52) U.S. Cl.
CPC ....... *H04N 1/00816* (2013.01); *G06T 7/0004* (2013.01); *H04N 1/00037* (2013.01); *H04N 1/00087* (2013.01); *G06T 2207/30144* (2013.01)

(58) Field of Classification Search
None
See application file for complete search history.

(56) References Cited

U.S. PATENT DOCUMENTS

2020/0068081 A1* 2/2020 Kurohata ........... H04N 1/00045

FOREIGN PATENT DOCUMENTS

JP   2004310726 A  * 11/2004
JP   2004310726 A    11/2004

* cited by examiner

*Primary Examiner* — Andrew H Lam
(74) *Attorney, Agent, or Firm* — Canon U.S.A., Inc. IP Division

(57) ABSTRACT

An image processing apparatus includes a print setting acquisition unit configured to acquire a print paper size, a threshold setting unit configured to set, based on the print paper size, a threshold for a protruding portion of a print product, the protruding portion protruding from a reading range, an image acquisition unit configured to acquire a scanned image of the print product, a detection unit configured to detect the protruding portion from the scanned image, and a conveyance displacement abnormality detection unit configured to detect conveyance displacement abnormality from the threshold and a result of the detection.

15 Claims, 17 Drawing Sheets

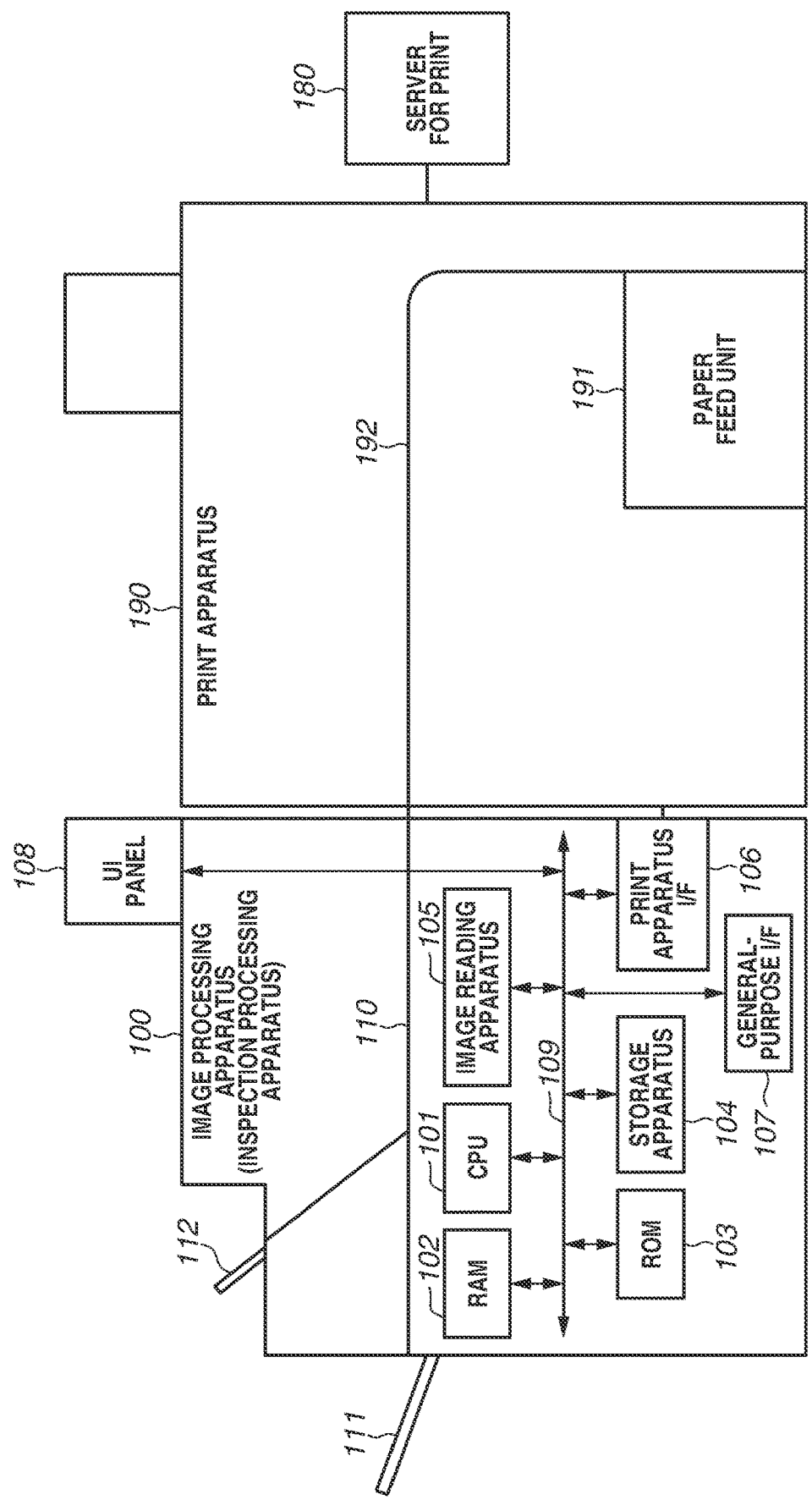

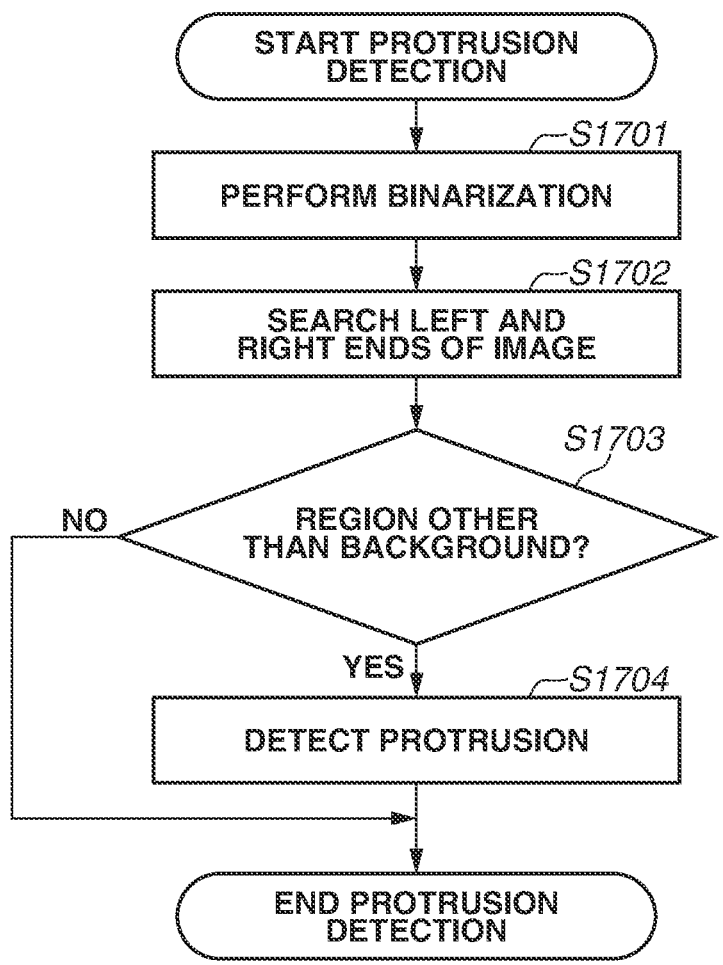

FIG.17

| PRINT PRODUCT INSPECTION UI | | | – □ × |
|---|---|---|---|
| PERMISSIBLE VALUE | | | |
| PRINT PAPER SIZE | PERMISSIBLE FLAG | PERMISSIBLE LENGTH | PERMISSIBLE AREA |
| A3 | TRUE | XX | XX |

IMAGE PROCESSING APPARATUS AND IMAGE PROCESSING METHOD FOR INSPECTING PRESENCE/ABSENCE OF A DEFECT IN A PRINT PRODUCT

BACKGROUND

Field of the Disclosure

The present disclosure relates to image processing for inspecting presence/absence of a defect in a print product.

Description of the Related Art

There is a case of performing an inspection operation to confirm that there is no defect in a print product and there is no problem in quality. For example, image data of a print product without any defect (hereinafter referred to as reference image data) is created in advance. Subsequently, image data of a print product serving as an inspection target (hereinafter referred to as print image data) is acquired by scanning, imaging, or the like. Inspection is then performed by comparing these two pieces of image data.

When the print image data is acquired by scanning or imaging, there is a case where part of the print product protrudes from an imaging range (reading range) and cannot be read. In such a case, when comparison is made between the reference image data and the print image data by extrapolation of a pixel value to a protruding region, there is a case where the protruding region is erroneously detected as a defect. Regarding this issue, Japanese Patent Application Laid-Open No. 2004-310726 discusses a technique of setting the protruding region as a non-inspection region and eliminating the non-inspection region from inspection to prevent erroneous detection of the protruding portion.

Nevertheless, there is a case where protrusion of the print product from the reading range is desired to be detected as abnormality depending on a size of paper, a size of the reading range, and a size of possible conveyance displacement. For example, a consideration is given to a case illustrated in FIG. 1A. When conveyance displacement of the print product occurs in this case, the print product can protrude from the reading range.

In FIG. 1B, print paper is sufficiently small compared with the reading range. Thus, the print paper does not normally protrude from the reading range even in consideration of a maximum conveyance displacement amount. If the print paper protrudes from the reading range in such a case, some kind of abnormality has possibly occurred in a conveyance device, and thus it is preferable to issue a warning as conveyance displacement abnormality.

SUMMARY

The present disclosure is directed to a technique of detecting protrusion in a case where the print product protrudes from the reading range.

According to an aspect of the present disclosure, an image processing apparatus includes a print setting acquisition unit configured to acquire a print paper size, a threshold setting unit configured to set, based on the print paper size, a threshold for a protruding portion of a print product, the protruding portion protruding from a reading range, an image acquisition unit configured to acquire a scanned image of the print product, a detection unit configured to detect the protruding portion from the scanned image, and a conveyance displacement abnormality detection unit configured to detect conveyance displacement abnormality from the threshold and a result of the detection.

Further features of the present disclosure will become apparent from the following description of exemplary embodiments with reference to the attached drawings.

BRIEF DESCRIPTION OF THE DRAWINGS

FIG. 2 is a diagram illustrating a configuration of an overall print system including an image processing apparatus.

FIG. 7 is a flowchart of protrusion detection processing according to one or more aspects of the presently disclosure.

FIG. 17 is a diagram exemplifying a user interface (UI) for setting a permissible value.

DESCRIPTION OF THE EMBODIMENTS

Figure 1A:
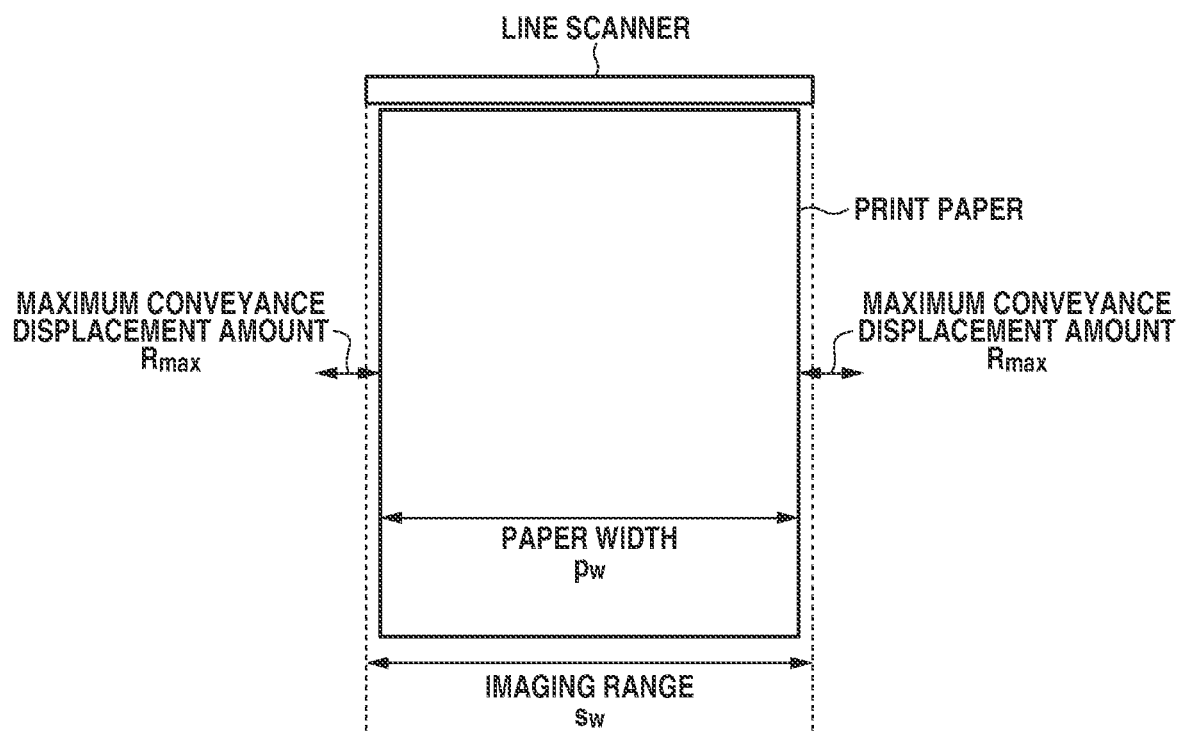
FIGS. 1A and 1B are diagrams each illustrating print paper and an imaging range.

Exemplary embodiments for implementing the present disclosure will be described below with reference to the accompanying drawings. The following exemplary embodiments do not necessarily limit the present disclosure. Not all combinations of features described in the exemplary embodiments are necessarily essential to a means for solving the issues addressed by the present disclosure.

A first exemplary embodiment will now be described. In the present exemplary embodiment, processing to be performed in a case where paper protrudes from an imaging range (hereinafter also referred to as a reading region) is changed in accordance with a size of paper serving as an inspection target. Note that inspection in the present exemplary embodiment is performed based on a difference between image data of a print product without any defect (reference image data) and image data serving as the inspection target (print image data).

FIG. 2 illustrates a configuration example of an overall print system that includes an image processing apparatus 100 and that outputs and inspects a print product. The print system according to the present exemplary embodiment includes the image processing apparatus 100, a server for print 180, and a print apparatus 190. The server for print 180 generates a print job for a document to be printed, and inputs the print job to the print apparatus 190. The print apparatus 190 forms an image on a recording media (paper) based on the print job input from the server for print 180. The print apparatus 190 includes a paper feed unit 191, and a user sets print paper in the paper feed unit 191 in advance.

When the print job is input to the print apparatus 190, the print apparatus 190 forms an image on a front side or both sides of print paper set in the paper feed unit 191 while conveying the print paper along a conveying path 192, and sends the print paper to the image processing apparatus 100.

The image processing apparatus 100 according to the present disclosure performs inspection processing to check presence/absence of a defect in a print product on which the print apparatus 190 has formed an image and that has been sent via the conveying path 192. That is, the image processing apparatus 100 functions as an inspection processing apparatus or an inspection unit. The image processing apparatus 100 incorporates a central processing unit (CPU) 101, a random-access memory (RAM) 102, a read-only memory (ROM) 103, a storage apparatus 104, an image reading apparatus 105, a print apparatus interface (I/F) 106 serving as an interface with the print apparatus 190, a general-purpose I/F 107, a user interface (UI) panel 108, and a main bus 109. The image processing apparatus 100 further includes a conveying path 110 for a print product, which is connected with the conveying path 192 of the print apparatus 190, an output tray 111 for a print product that has passed inspection, and an output tray 112 for a print product that has failed to pass the inspection. Note that these output trays may be configured as a separate apparatus from the print apparatus 190.

The CPU 101 is a processor that performs overall control of each unit in the image processing apparatus 100. The RAM 102 functions as a main memory of the CPU 101, a work area, and the like. The ROM 103 stores therein a program set to be executed by the CPU 101. The storage apparatus 104 stores therein an application to be executed by the CPU 101, data to be used for image processing, and the like.

The image reading apparatus (scanner) 105 can read one side or both sides of a print product that has been sent from the print apparatus 190 on the conveying path 110 and acquire data as image data. In the present exemplary embodiment, assume that the image reading apparatus 105 is a line-scanner. The print apparatus I/F 106 is connected with the print apparatus 190, and is capable of synchronizing a timing of processing a print product with the print apparatus 190 and communicating with the print apparatus 190 about operational statuses of one another. The general-purpose I/F 107 is a serial bus interface, such as a universal serial bus (USB) and Institute of Electrical and Electronics Engineers (IEEE) 1394, and a user can extract data such as a log.

A UI panel 108 is a liquid crystal display that displays a user interface, and displays a current status and settings and delivers the current situation and the settings to the user. In addition, the UI panel 108 receives a print setting such as a size and type of paper from the user via, for example, a mouse or a keyboard that is connected with the general-purpose I/F 107. The mouse or the keyboard is not specifically illustrated. The main bus 109 connects each unit of the image processing apparatus 100.

Although not illustrated in FIG. 2, an instruction from the CPU 101 allows each of internal units of the image processing apparatus 100 or the print system to operate, for example, allows the conveying paths to operate in synchronization and allows a sending destination of a print product to be switched between the output tray 111 for the print product that has passed inspection and the output tray 112 for the print product that has failed to pass the inspection in accordance with an inspection result.

As a whole, the image processing apparatus 100 performs inspection processing, which will be described below, based on image data of a print product read by the image reading apparatus 105, while conveying the print product sent from the print apparatus 190 via the conveying path 110. If the print product passes the inspection, the print product is conveyed to the output tray 111 for the print product that has passed the inspection. Otherwise, the print product is conveyed to the output tray 112 for the print product that has failed to pass the inspection. In this manner, only print products with which quality has been confirmed can be collected on the output tray 111 as print products for delivery.

Figure 3:
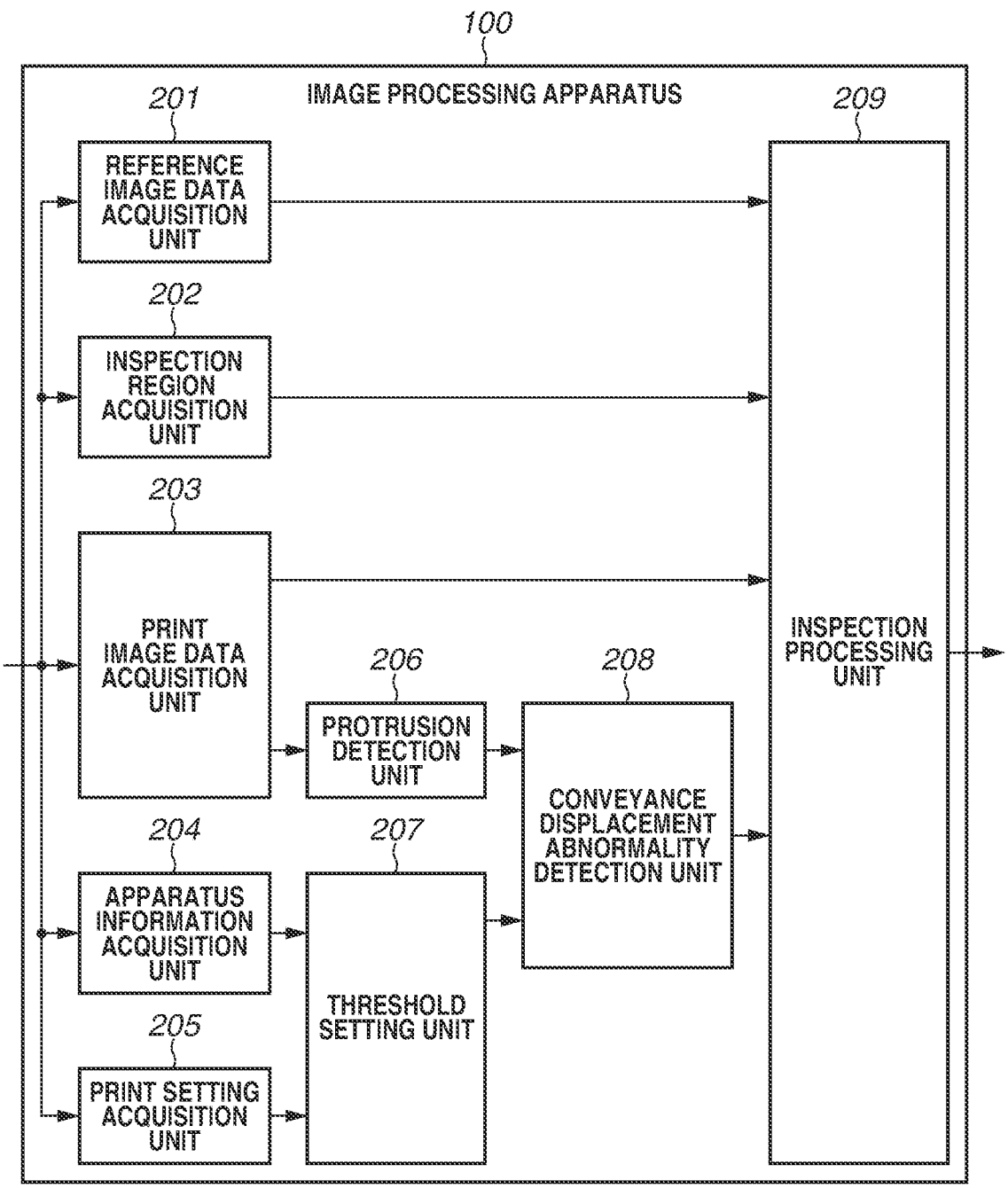
FIG. 3 is a block diagram illustrating a functional configuration of the image processing apparatus.

FIG. 3 illustrates a functional configuration of the image processing apparatus 100. The image processing apparatus 100 includes a reference image data acquisition unit 201 as an image acquisition unit. In addition, the image processing apparatus 100 includes an inspection region acquisition unit 202, a print image data acquisition unit 203, an apparatus information acquisition unit 204, a print setting acquisition unit 205, a protrusion detection unit 206, a threshold setting unit 207, a conveyance displacement abnormality detection unit 208, and an inspection processing unit 209.

The reference image data acquisition unit 201 acquires reference image data indicating a reference image that serves as a criterion for inspection. The inspection region acquisition unit 202 acquires inspection region image data indicating a region serving as an inspection target. The inspection region image data is, for example, image data in which a pixel value in the region serving as the inspection target is a positive value and a pixel value in a region excluded from the inspection target is zero. The print image data acquisition unit 203 acquires print image data that is obtained by the image reading apparatus 105 reading a print product on the conveying path 110 and that indicates a print image of the inspection target.

The apparatus information acquisition unit 204 acquires information regarding design values and parameters of the print apparatus 190 and the image processing apparatus 100. The print setting acquisition unit 205 acquires a print setting of the print apparatus 190.

The protrusion detection unit 206 determines whether the entire print product is included in the print image data. The threshold setting unit 207 sets a permissible value in a case where print paper protrudes from the imaging range based on the apparatus information and the print setting. The conveyance displacement abnormality detection unit 208 detects conveyance displacement abnormality of the print product.

In a case where the conveyance displacement abnormality detection unit 208 has not detected conveyance displacement abnormality, the inspection processing unit 209 performs inspection on the print image data using the reference image data and the print image data.

Figure 4:
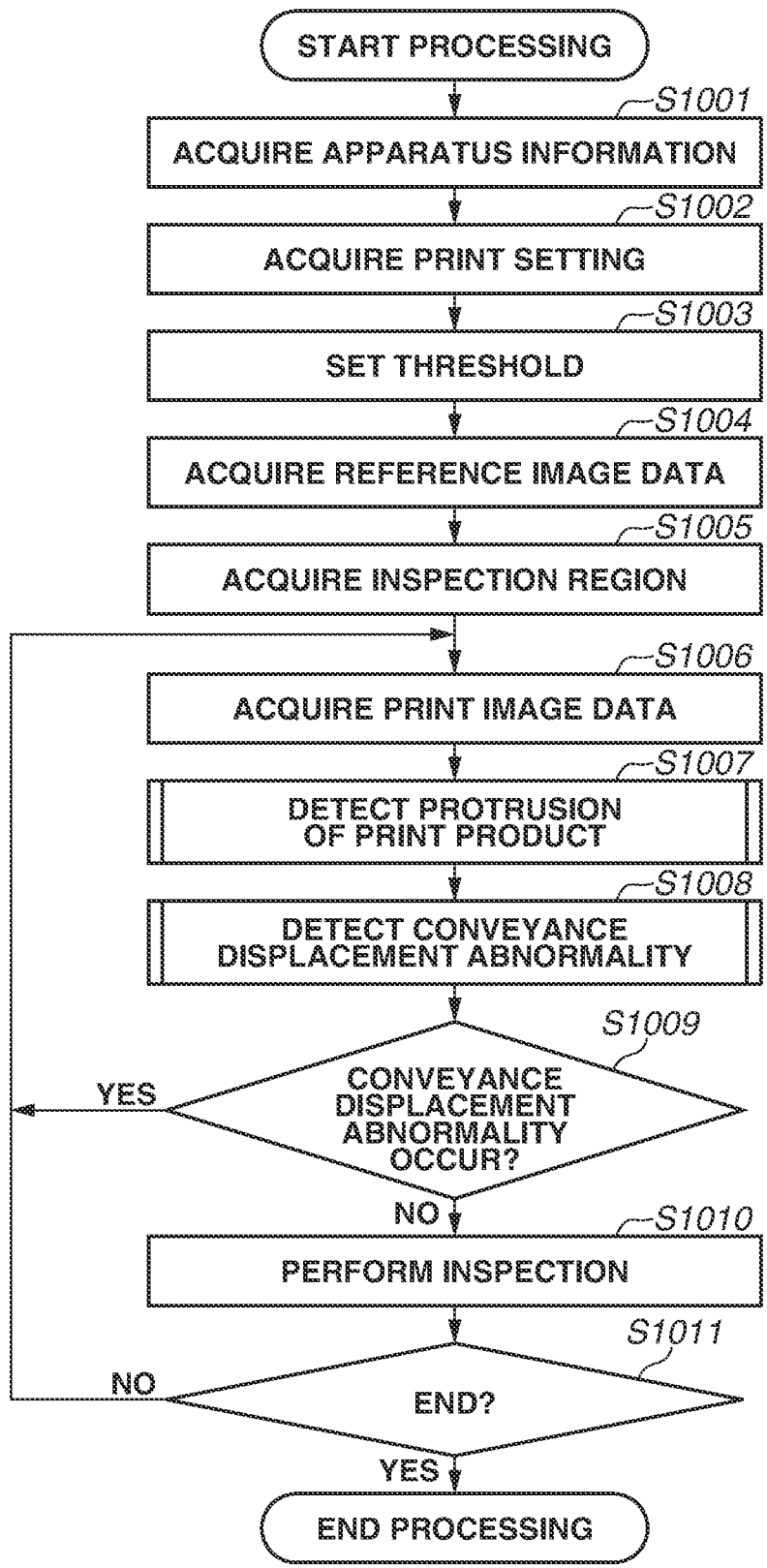
FIG. 4 is a flow chart according to one or more aspects of the presently disclosure.

FIG. 4 is a flowchart illustrating processing executed by the image processing apparatus 100 according to the first exemplary embodiment. In the following description, each step (process) is described by attaching S before a reference sign.

In step S1001, the apparatus information acquisition unit 204 acquires information of the print apparatus 190 and the image processing apparatus 100, which is stored in the RAM 102. Specifically, the apparatus information acquisition unit 204 acquires a maximum conveyance displacement amount that occurs during conveyance on the conveying paths 110 and 192 and the imaging range of the image reading apparatus 105. Assume that the maximum conveyance displacement amount is a maximum value of conveyance displacement that may be generated at the time of conveyance.

In step S1002, the print setting acquisition unit 205 acquires print setting information of the print apparatus 190. Specifically, the print setting acquisition unit 205 acquires a size of print paper. In the following description, the print setting information is also simply referred to as a print setting.

In step S1003, the threshold setting unit 207 sets a threshold in a case where the print paper protrudes from the imaging range based on the apparatus information acquired in step S1001 and the print setting acquired in step S1002. In the present exemplary embodiment, assume that a permissible flag T0 indicating whether protrusion is permitted is set as the threshold.

Figure 1B:
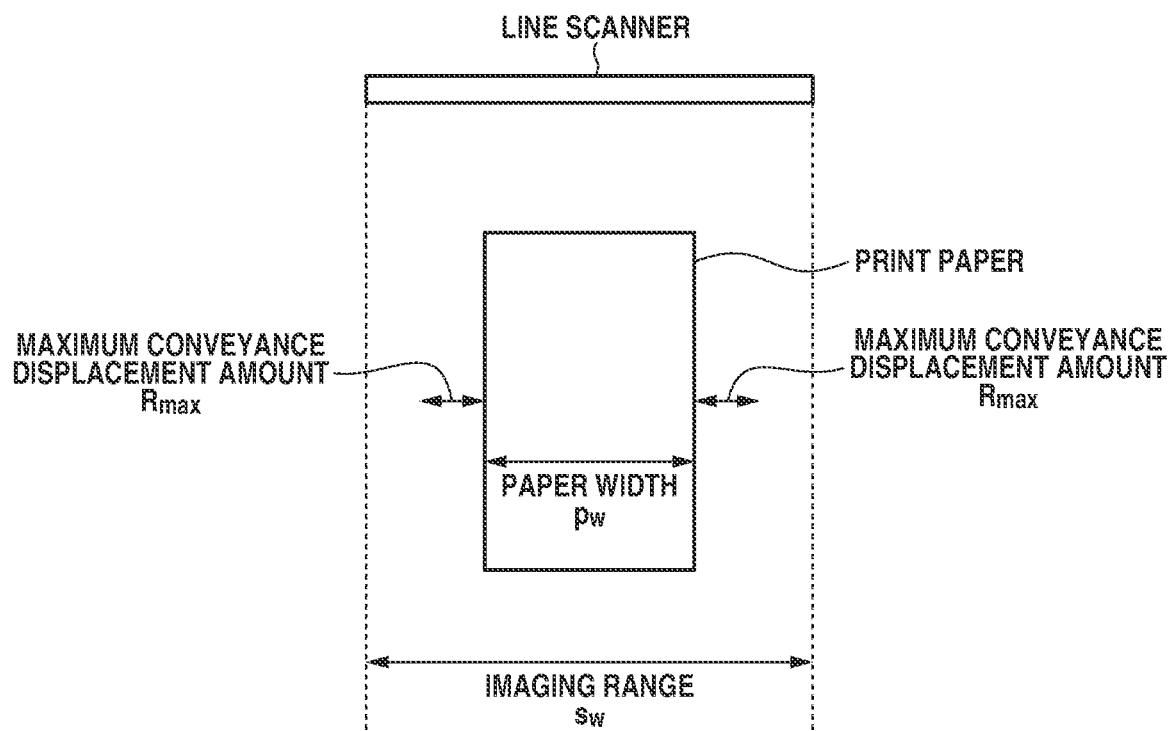

In a case where there is a possibility for protrusion, protrusion is permitted as T0=TRUE. In a case where there is no possibility for protrusion, protrusion is not permitted as T0=FALSE. If protrusion occurs in a case where protrusion is not permitted, it is determined that the conveyance displacement abnormality has occurred. There is a possibility that conveyance displacement of the print product occurs on the right and left sides. Whether there is a possibility that the print product protrudes from the imaging range can be calculated by the following Expression (1) from FIG. 1.

$$T0 = \begin{cases} \text{TRUE} & (\text{if } p_w + 2R_{max} - s_w \geq 0) \\ \text{FALSE} & (\text{if } p_w + 2R_{max} - s_w < 0) \end{cases} \quad \text{Expression (1)}$$

In the Expression (1), T0 represents the permissible flag, $p_w$ represents a width of the print paper, $R_{max}$ represents the maximum conveyance displacement amount, and $s_w$ represents the imaging range. Assume that protrusion is permitted in a case of T0=TRUE, and protrusion is not permitted in a case of T0=FALSE.

In a case where the width $p_w$ of the print paper is equal to or greater than $s_W - 2R_{max}$, since there is a possibility for protrusion of the print paper from the imaging range due to conveyance displacement, setting is made as T0=TRUE. In a case where the width $p_w$ of the print paper is less than $s_W - 2R_{max}$, since there is no possibility for protrusion of the print paper from the imaging range due to conveyance displacement, setting is made as T0=FALSE.

In step S1004, the reference image data acquisition unit 201 acquires reference image data indicating a reference image serving as a criterion for inspection. Assume that the reference image is stored in the storage apparatus 104 as a scanned image created in advance by scanning of the print product with which no stain is visually confirmed in advance.

In step S1005, the inspection region acquisition unit 202 acquires inspection region image data indicating a region serving as an inspection target. Assume that the inspection region image data acquired herein is created in advance and stored in the RAM 102. How to create the inspection region image data will now be described.

The inspection according to the present exemplary embodiment is performed based on a difference between the reference image data and the print image data. In a case where part of the print product protrudes from the imaging range, there is a case where the difference cannot be calculated correctly in a protruding region, leading to an erroneous inspection result. To address this, the inspection region image data in which only a region that infallibly falls within the imaging range is created as the inspection target.

A region A that infallibly falls within the imaging range can be calculated by the Expression (2).

$$A = s_w - 2R_{max} \quad \text{Expression (2)}$$

Figure 5:
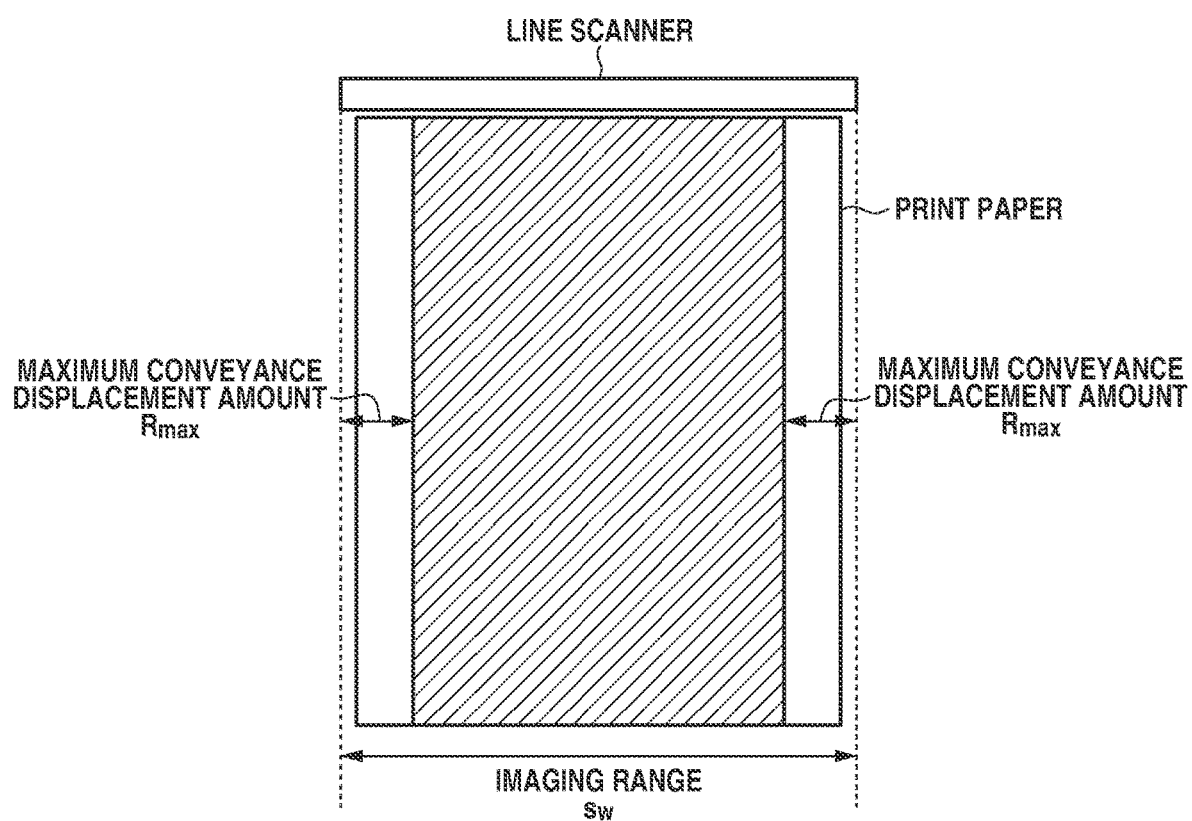
FIG. 5 is a schematic view illustrating an inspection region.

Consequently, an inspection target region is as illustrated in FIG. 5, for example. A hatched portion in FIG. 5 indicates the inspection target region. Taking the center of a scanner as a reference, assume that one-half of a range that falls within the imaging range from the center is the range that infallibly falls within the imaging range and set as the inspection target.

In step S1006, the print image data acquisition unit 203 acquires print image data that is obtained by the image reading apparatus 105 reading the print product on the conveying path 110 and that indicates a print image serving as the inspection target.

In step S1007, the protrusion detection unit 206 detects protrusion of the print product from the imaging range from the print image data acquired in step S1006. Details of protrusion detection will be described below.

In step S1008, the conveyance displacement abnormality detection unit 208 detects conveyance displacement abnormality of the print product. Conveyance displacement abnormality detection processing will be described below.

In step S1009, the conveyance displacement abnormality detection unit 208 determines whether the conveyance displacement abnormality is detected in step S1008. If the conveyance displacement abnormality is detected (YES in step S1009), the conveyance displacement abnormality detection unit 208 makes notification about the conveyance displacement abnormality, and the processing proceeds to step S1006. If the conveyance displacement abnormality detection unit 208 does not detect the conveyance displacement abnormality (NO in step S1009), the processing proceeds to inspection processing in step S1010.

In step S1010, the inspection processing unit 209 first performs positioning of patterns between the reference image data and the print image data. The positioning is, for example, performed by a method of comparing luminance of partial images commonly observed in the reference image data and the print image data by template matching and calculating a displacement amount in which a degree of matching becomes a maximum. Subsequently, the inspection processing unit 209 extracts a difference between the reference image data and the print image data subjected to the positioning. The inspection processing unit 209 extracts a pixel that causes a difference that is larger than a predetermined value as a defect.

In step S1011, according to the present exemplary embodiment, it is determined whether the conveyance displacement abnormality has been detected or whether print of the print apparatus 190 has ended. In a case where the conveyance displacement abnormality has been detected or print of the print apparatus 190 has ended (YES in step S1011), the processing ends. In a case where print continues (NO in step S1011), the processing returns to step S1006 and continues.

(Details of Protrusion Detection)

Figure 6A:
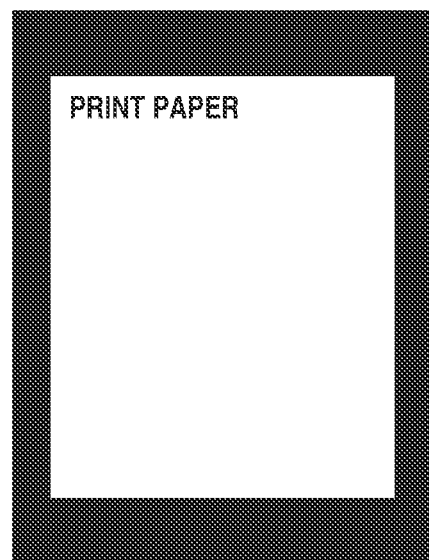
FIGS. 6A and 6B each illustrate an example of a scanned image of a print product that protrudes from an imaging range.
Figure 6B:
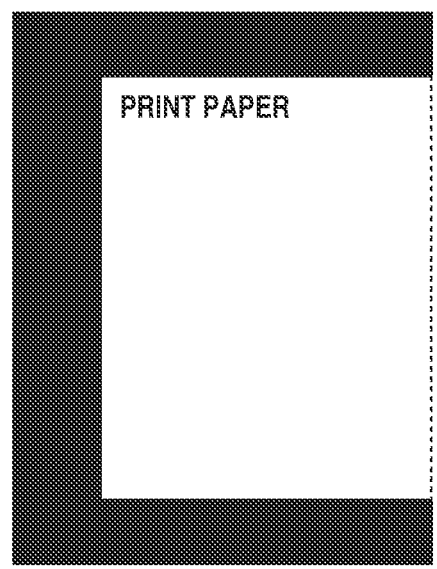

Protrusion detection processing preformed in step S1007 will now be described. FIG. 6A illustrates an example of print image data in which protrusion from the imaging range is not present. FIG. 6B illustrates an example of print image data in which protrusion from the imaging range is present.

FIG. 7 is a flowchart of the protrusion detection processing. When the image reading apparatus 105 reads the print product on the conveying path 110, a color of a region where the print product does not exist becomes a background color (black in the case of the present exemplary embodiment). In a case where protrusion occurs, since the print product exits at an end of sensor reading, a pixel value for a color other than the background color exists at an end of the print image data. Since the image reading apparatus 105 is the line scanner in the present exemplary embodiment, there is a possibility that protrusion occurs only in the right and left directions if the image reading apparatus 105 performs reading at an appropriate timing.

In step S1701, the protrusion detection unit 206 sets a threshold to binarize pixel values into a pixel value for the print paper and a pixel value for the background color, and acquires a binary image in which the pixel value of a region corresponding to the print paper is 1 and the pixel value of a region corresponding to the background is 0.

In step S1702, the protrusion detection unit 206 checks, with respect to the binary image acquired in step S1701, whether the pixel value of 1 corresponding to the print paper exists among pixel values of the right and left ends of the image.

In step S1703, the protrusion detection unit 206 determines whether it has been confirmed that the pixel value of 1 exits, that is, the binary image is a region other than the background. If the protrusion detection unit 206 confirmed that the binary image is a region other than the background (YES in step S1703), the processing proceeds to step S1704. If the protrusion detection unit 206 has not confirmed that the binary image is a region other than the background (NO in step S1703), the protrusion detection processing ends.

In step S1704, the protrusion detection unit 206 records that protrusion has been detected, and ends the protrusion detection processing.

(Details of Conveyance Displacement Abnormality Detection Processing)

Figure 8:
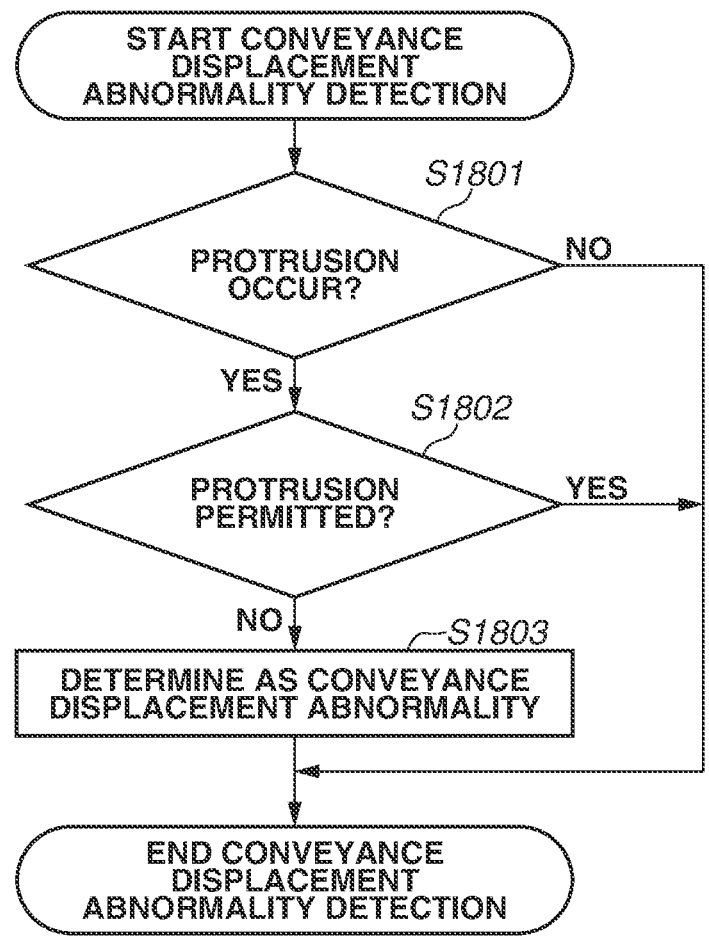
FIG. 8 is a flowchart of conveyance displacement abnormality detection processing according to one or more aspects of the presently disclosure.

The conveyance displacement abnormality detection processing performed in step S1008 will now be described with reference to a flowchart in FIG. 8.

In step S1801, the conveyance displacement abnormality detection unit 208 first checks a result of the protrusion detection performed in step S1007. In a case where protrusion is detected (YES in step S1801), the processing proceeds to step S1802. In a case where protrusion is not detected (NO in step S1801), the conveyance displacement abnormality detection unit 208 determines that conveyance is normally performed and ends the processing.

In step S1802, the conveyance displacement abnormality detection unit 208 checks the threshold set in step S1003. In the present exemplary embodiment, the conveyance displacement abnormality detection unit 208 checks the permissible flag T0. In a case where a setting is made to permit protrusion (T0=TRUE) (YES in step S1802), the conveyance displacement abnormality detection unit 208 determines that the conveyance is normally performed and ends the processing. In a case where a setting is made not to permit protrusion (T0=FALSE)(NO in step S1802), the processing proceeds to step S1803.

In step S1803, the conveyance displacement abnormality detection unit 208 determines that the conveyance displacement abnormality has occurred because protrusion is present despite the setting being made not to permit protrusion, and ends the processing.

The processing described above enables detection of protrusion desirably when the print product protrudes from the imaging range.

A second exemplary embodiment will now be described. In the present exemplary embodiment, a permissible length T1 representing a maximum length for possible protrusion of the print product is set as a threshold, in addition to the permissible flag T0. If a protrusion length of the print product is greater than the permissible length T1 even in a case where protrusion of the print product is permitted, it is determined that the conveyance displacement abnormality has occurred.

Figure 9A:
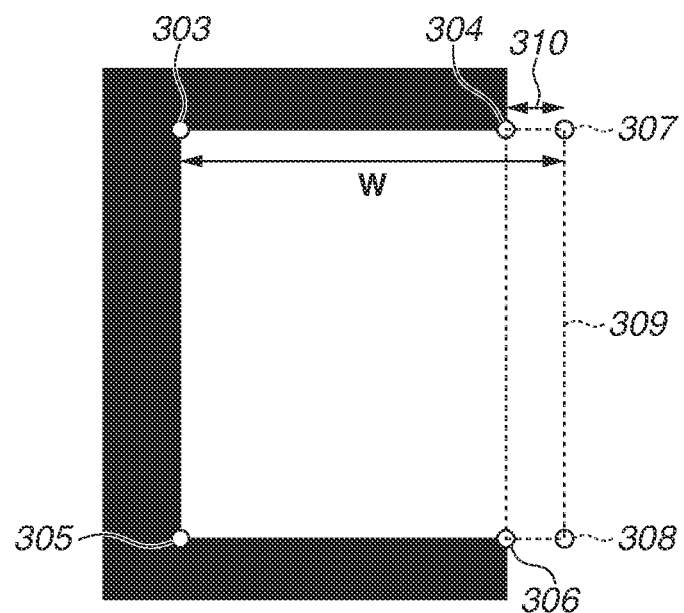
FIGS. 9A and 9B are diagrams each illustrating protrusion detection processing according to one or more aspects of the presently disclosure.
Figure 9B:
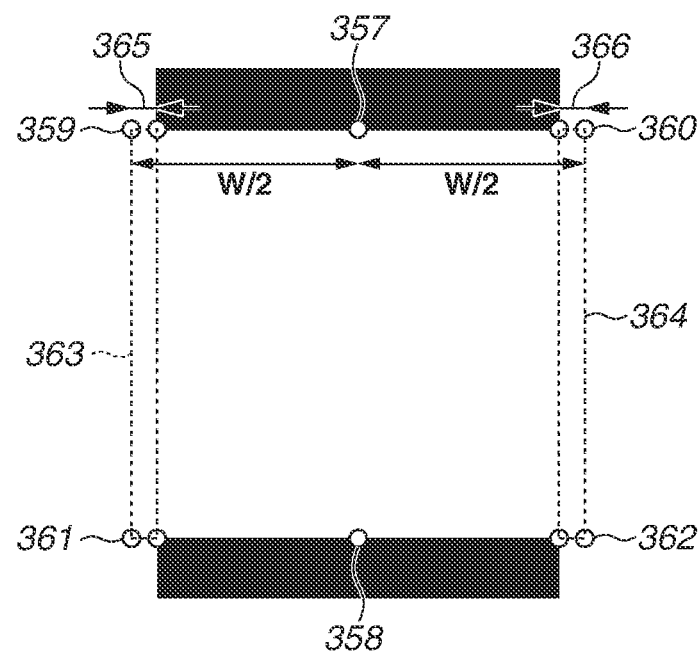

FIGS. 9A and 9B each illustrate an example of print image data in a case where the print product protrudes from the imaging range. FIG. 9A illustrates an example in which protrusion occurs on the right side, and FIG. 9B illustrates an example in which protrusion occurs on the left and right sides. A region 309 surrounded by dotted lines in FIG. 9A and regions 363 and 364 surrounded by dotted lines in FIG. 9B each represent a region of the print product protruding from the imaging range. In addition, an arrow 310 in FIG. 9A and arrows 365 and 366 in FIG. 9B each represent a length of the print product protruding from the imaging range.

Figure 10:
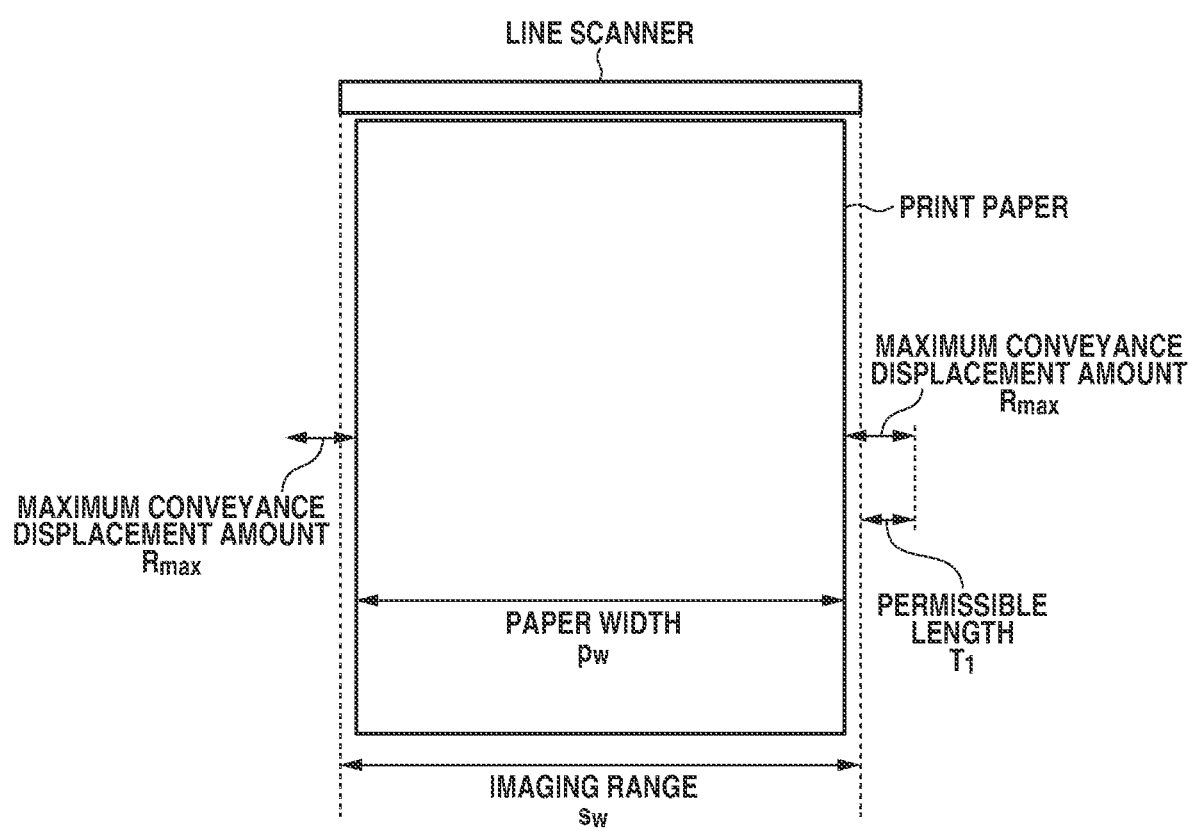
FIG. 10 is a diagram illustrating a protrusion permissible length according to one or more aspects of the presently disclosure.

In the present exemplary embodiment, a modification is made to each processing in steps S1003, S1007, and S1008 of the first exemplary embodiment. While the permissible flag T0 indicating whether to permit protrusion of the print product from the imaging range is set as the threshold in step S1003 in the first exemplary embodiment, the permissible length T1 indicating the maximum length for possible protrusion of the print product is additionally set in step S1003 in the present exemplary embodiment. A relationship among the imaging range, the print paper, the maximum conveyance displacement amount, and the permissible length is as illustrated in FIG. 10. Hence, the permissible length T1 is calculated as follows.

$$T1 = \begin{cases} \dfrac{p_w + 2R_{max} - s_w}{2} & (T_0 = \text{TRUE}) \\ 0 & (T_0 = \text{FALSE}) \end{cases} \quad \text{Expression (3)}$$

In the Expression (3), T1 represents the permissible length, $p_w$ represents the width of the print paper, $R_{max}$ represents the maximum conveyance displacement amount, and $s_w$ represents the imaging range.

In a case where the width $p_w$ of the print paper is equal to or greater than $s_w - 2R_{max}$, since there is a possibility for protrusion of the print paper from the imaging range due to conveyance displacement, the maximum length for possible protrusion is set as T1. In a case where the width $p_w$ of the print paper is less than $s_w - 2R_{max}$, since there is no possibility for protrusion of the print paper from the imaging range due to conveyance displacement, setting is made as T1=0.

Figure 11:
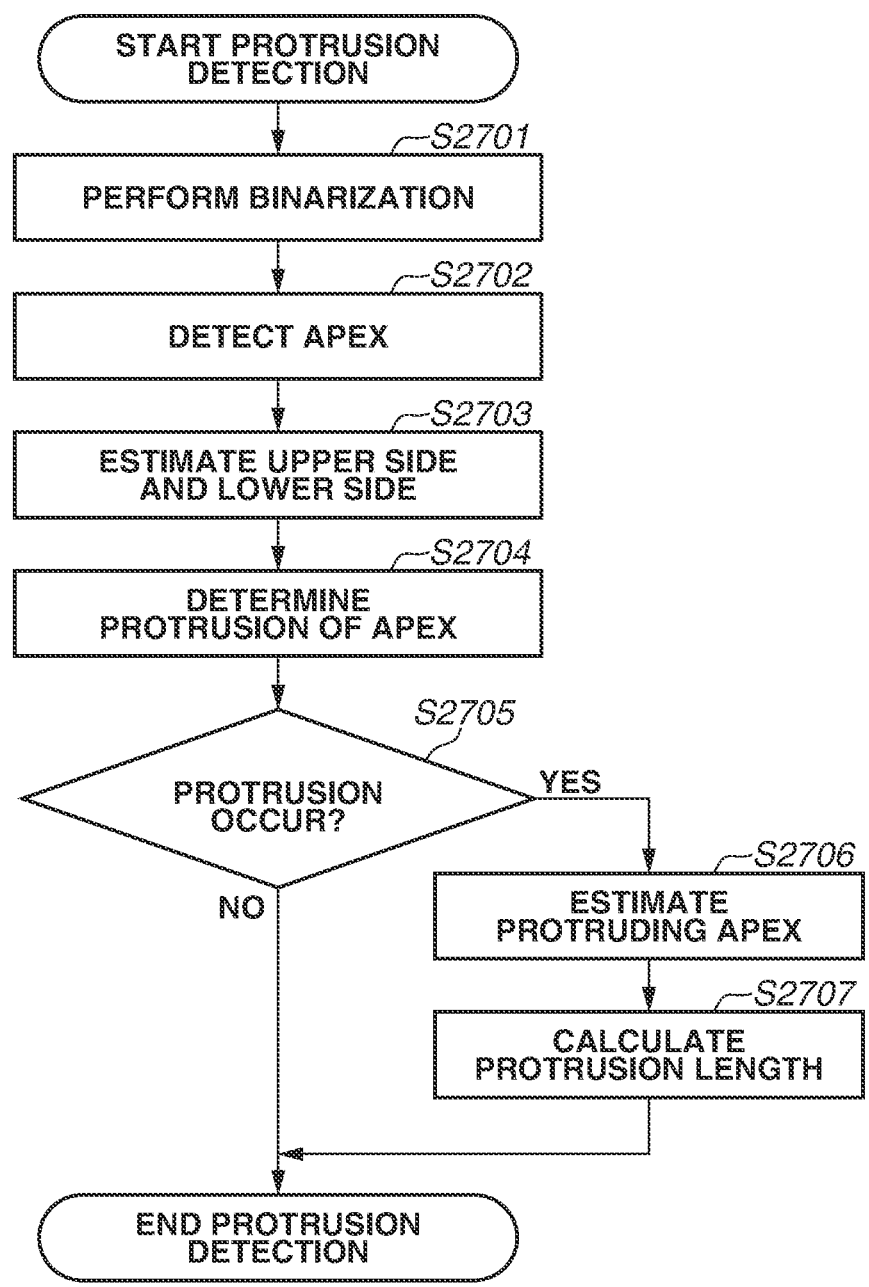
FIG. 11 is a flowchart of protrusion detection processing according to one or more aspects of the presently disclosure.

In step S1007 in the present exemplary embodiment, processing of calculating the protrusion length is added to the protrusion detection processing performed by the protrusion detection unit 206. The protrusion detection processing according to the present exemplary embodiment will now be described using a flowchart illustrated in FIG. 11.

In step S2701, the protrusion detection unit 206 binarizes the print image data.

In step S2702, the protrusion detection unit 206 detects apexes in the print image data. The protrusion detection unit 206 tracks pixels serving as a boundary between the pixel value of 0 and the pixel value of 1, and detects apexes from a locus of the pixels. For example, four apexes of 303, 304, 305, and 306 are detected in the case of FIG. 9A.

In step S2703, the protrusion detection unit 206 estimates apexes constituting an upper side and a lower side in the print image data. For example, in the case of FIG. 9A, the protrusion detection unit 206 estimates the apexes 303 and 304 as apexes constituting the upper side and the apexes 305 and 306 as apexes constituting the lower side.

In step S2704, the protrusion detection unit 206 determines whether the upper side and the lower side protrude. The protrusion detection unit 206 determines protrusion based on whether an apex is in contact with the left or right end of the print image data. In a case where the apex is in contact with the left or right end, the protrusion detection unit 206 determines the apex as a start point. For example, in the case of FIG. 9A, the protrusion detection unit 206 determines the apexes 303 and 305 as non-protruding apexes, and the apexes 304 and 306 as protrusion start points.

In a case where the upper side and the lower side protrude (YES in step S2705), the processing proceeds to step S2706. Otherwise (NO in step S2705), the protrusion detection unit 206 determines that no protrusion is detected, and ends the processing.

In step S2706, the protrusion detection unit 206 estimates a protruding apex. In a case where an apex constituting either the upper side or the lower side protrudes, the protrusion detection unit 206 estimates a point having coordinates away from a non-protruding apex that is on a corresponding straight line by a paper width W as the protruding apex. For example, in the case of FIG. 9A, the apexes 307 and 308 that are away from the non-protruding apexes 303 and 305 by the paper width W, respectively, are estimated as the protruding apexes.

In a case where both apexes protrude, the protrusion detection unit 206 assumes that the apexes protrude on the right and left side by an equal distance, and estimates points having coordinates that are away from the center of the corresponding straight line by W/2, i.e., a half of the paper width as the protruding apexes. For example, in the case of FIG. 9B, the protrusion detection unit 206 estimates apexes 359 and 360 that are away from a center 357 of the upper side by W/2, i.e., the half of the paper width as the protruding apexes, and estimates apexes 361 and 362 that are away from a center 358 of the lower side by W/2, i.e., the half of the paper width as the protruding apexes.

In step S2707, the protrusion detection unit 206 calculates the protrusion length. The protrusion detection unit 206 obtains a length between the protrusion start point determined in step S2704 and the corresponding protruding apex estimated in step S2706, and sets the length as the protrusion length. In a case where a plurality of protruding apexes exists, the protrusion detection unit 206 obtains a protrusion length of each protruding apex, and sets a maximum value as the protrusion length of the print image data.

Figure 12:
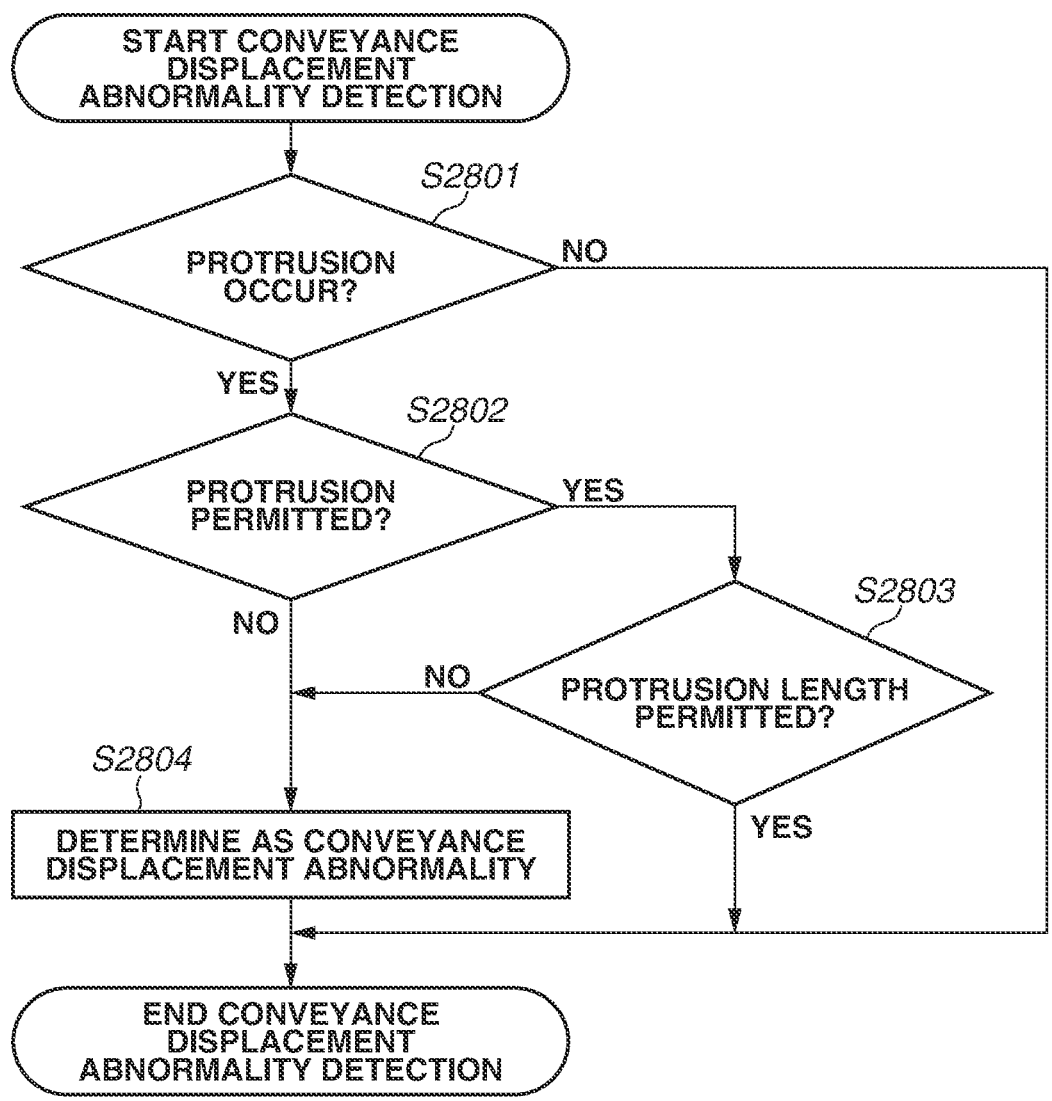
FIG. 12 is a flowchart of conveyance displacement abnormality detection processing according to one or more aspects of the presently disclosure.

In step S1008 according to the present exemplary embodiment, even when protrusion is permitted, the protrusion detection unit 206 detects the conveyance displacement abnormality in a case where the protrusion length calculated in step S1007 is greater than the permissible length T1 set in step S1003. The processing in step S1008 according to the present exemplary embodiment is now described using a flowchart illustrated in FIG. 12.

In step S2801, the conveyance displacement abnormality detection unit 208 first checks a result of the protrusion detection performed in step S1007. In a case where protrusion is detected (YES in step S2801), the processing proceeds to step S2802. In a case where protrusion is not detected (NO in step S2801), the conveyance displacement abnormality detection unit 208 determines that conveyance is normally performed and ends the processing.

In step S2802, in a case where protrusion is detected, the conveyance displacement abnormality detection unit 208 checks the permissible flag T0 set in step S1003. In a case where the setting is made to permit protrusion (T0=TRUE) (YES in step S2803), the processing proceeds to step S2803. In a case where the setting is made not to permit protrusion (T0=FALSE) (NO in step S2803), the processing proceeds to step S2804.

In step S2803, in a case where protrusion is permitted, the conveyance displacement abnormality detection unit 208 makes comparison between the permissible length T1 set in step S1003 and the protrusion length obtained in step S1007. In a case where the protrusion length is less than the permissible length T1 (YES in step S2803), the conveyance displacement abnormality detection unit 208 determines that conveyance is normally performed, and ends the processing. In a case where the protrusion length is greater than the permissible length T1 (NO in step S2803), the processing proceeds to step S2804.

In step S2804, since protrusion occurs despite the setting being made not to permit protrusion, or protrusion at a length that cannot be permitted occurs while the setting is made to permit protrusion, the conveyance displacement abnormality detection unit 208 determines that the conveyance displacement abnormality has occurred, and ends the conveyance displacement abnormality detection processing.

In addition, the present exemplary embodiment uses both the permissible flag T0 and the permissible length T1 as thresholds, but may use only the permissible length T1 as a threshold. In this case, the permissible length T1 is obtained in step S1003 as follows.

$$T1 = \begin{cases} \dfrac{p_w + 2R_{max} - s_w}{2} & (\text{if } p_w + 2R_{max} - s_w \geq 0) \\ 0 & (\text{if } p_w + 2R_{max} - s_w < 0) \end{cases} \quad \text{Expression (4)}$$

In a case where protrusion is detected in step S2801 in the conveyance displacement abnormality detection processing in step S1008, the processing proceeds to step S2803. In step S2803, the conveyance displacement abnormality detection unit 208 checks the protrusion length.

The processing described above enables detection of protrusion as abnormality depending on the protrusion length when the print product protrudes from the imaging range.

A third exemplary embodiment will now be described. In the present exemplary embodiment, a permissible area T2 representing a maximum area where there is a possibility for protrusion of the print product is set as a threshold in addition to the permissible flag T0. Even in a case where protrusion of the print product is permitted, it is determined that the conveyance displacement abnormality has occurred when a protrusion area of the print product is larger than the permissible area T2.

The region 309 surrounded by dotted lines in FIG. 9A and the regions 363 and 364 surrounded by dotted lines in FIG. 9B represent regions of the print product protruding from the imaging range. The conveyance displacement abnormality detection is performed based on an area of this region.

Figure 13:
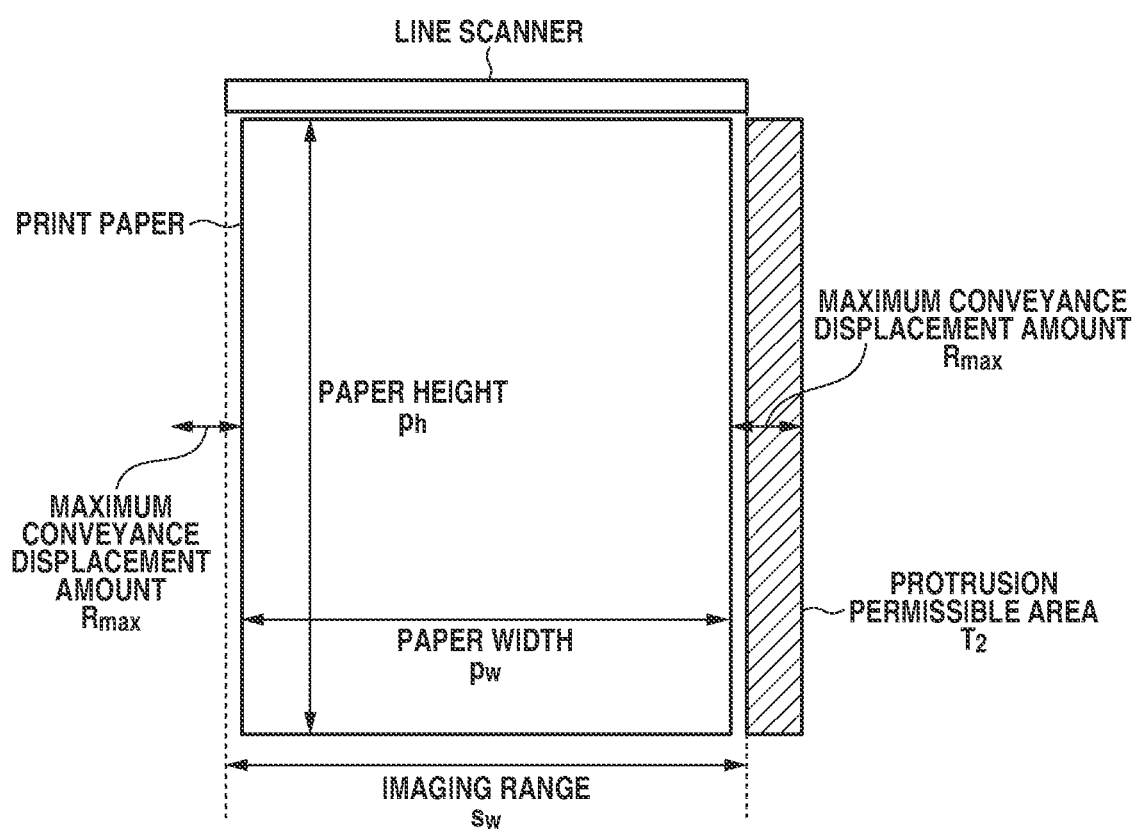
FIG. 13 is a diagram for describing a protrusion permissible area according to one or more aspects of the presently disclosure.

In the present exemplary embodiment, modification is made to steps S1003, S1007, and S1008 according to the first exemplary embodiment. While the setting is made whether to permit protrusion of the print product from the imaging range in step S1003 in the first exemplary embodiment, the conveyance displacement abnormality detection unit 208 additionally calculates a maximum protrusion area and sets the maximum protrusion area as the protrusion permissible area in step S1003. A relationship among the imaging range, the print paper, the maximum conveyance displacement amount, and the protrusion permissible area is as illustrated in FIG. 13. Thus, the permissible area T2 is obtained as follows.

$$T2 = \begin{cases} \dfrac{(p_w + 2R_{max} - s_w)p_h}{2} & (T_0 = \text{TRUE}) \\ 0 & (T_0 = \text{FALSE}) \end{cases} \quad \text{Expression (5)}$$

In the Expression (5), T2 represents the permissible area, $p_w$ represents the width of the print paper, $p_h$ represents a height of the print paper, $R_{max}$ represents the maximum conveyance displacement amount, and $s_w$ represents the imaging range.

In a case where the width $p_w$ of the print paper is equal to or greater than $s_w - 2R_{max}$, since there is a possibility for protrusion of the print paper from the imaging range due to conveyance displacement, a maximum area where there is a possibility for protrusion is set as T2. In a case where the width $p_w$ of the print paper is less than $s_w - 2R_{max}$, since there is no possibility for protrusion of the print paper from the imaging range due to conveyance displacement, setting is made as T2=0.

Figure 14:
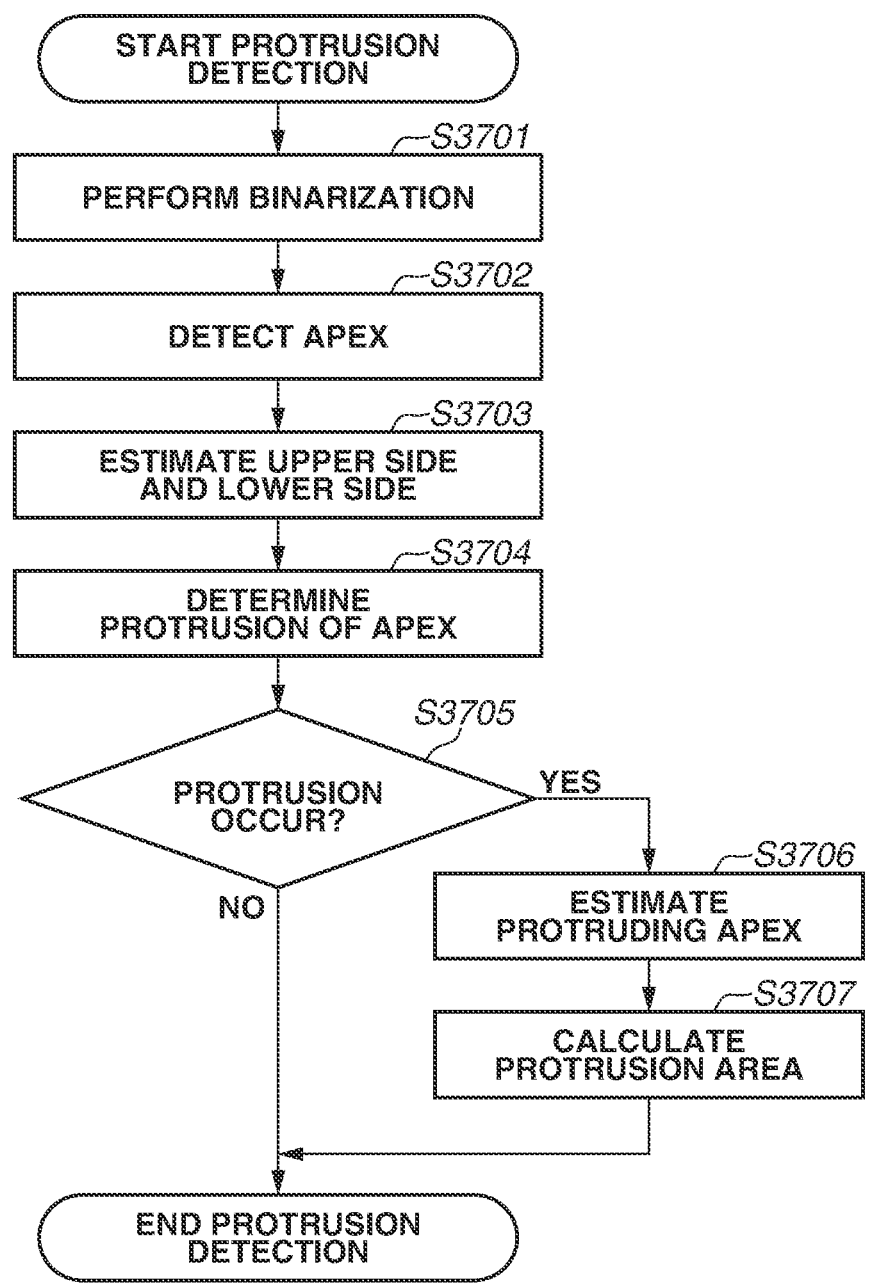
FIG. 14 is a flowchart of protrusion detection processing according to one or more aspects of the presently disclosure.

In step S1007 in the present exemplary embodiment, processing of calculating the protrusion area is added to the protrusion detection performed by the protrusion detection unit 206. The processing flow of the protrusion detection processing according to the present exemplary embodiment will now be described with reference to a flowchart illustrated in FIG. 14.

Since the processing in steps S3701 to S3706 is identical to that in steps S2701 to S2706 described above, a description thereof is omitted.

In step S3707, the protrusion detection unit 206 calculates the protrusion area. Since the protruding region is estimated from the protrusion start points determined in step S3704 and the protruding apexes estimated in step S3706, an area of the protruding region is determined as the protrusion area. In a case where a plurality of protruding regions exists, the protrusion detection unit 206 obtains an area of each protruding region, and sets a maximum value as the protrusion area of the print image data.

Figure 15:
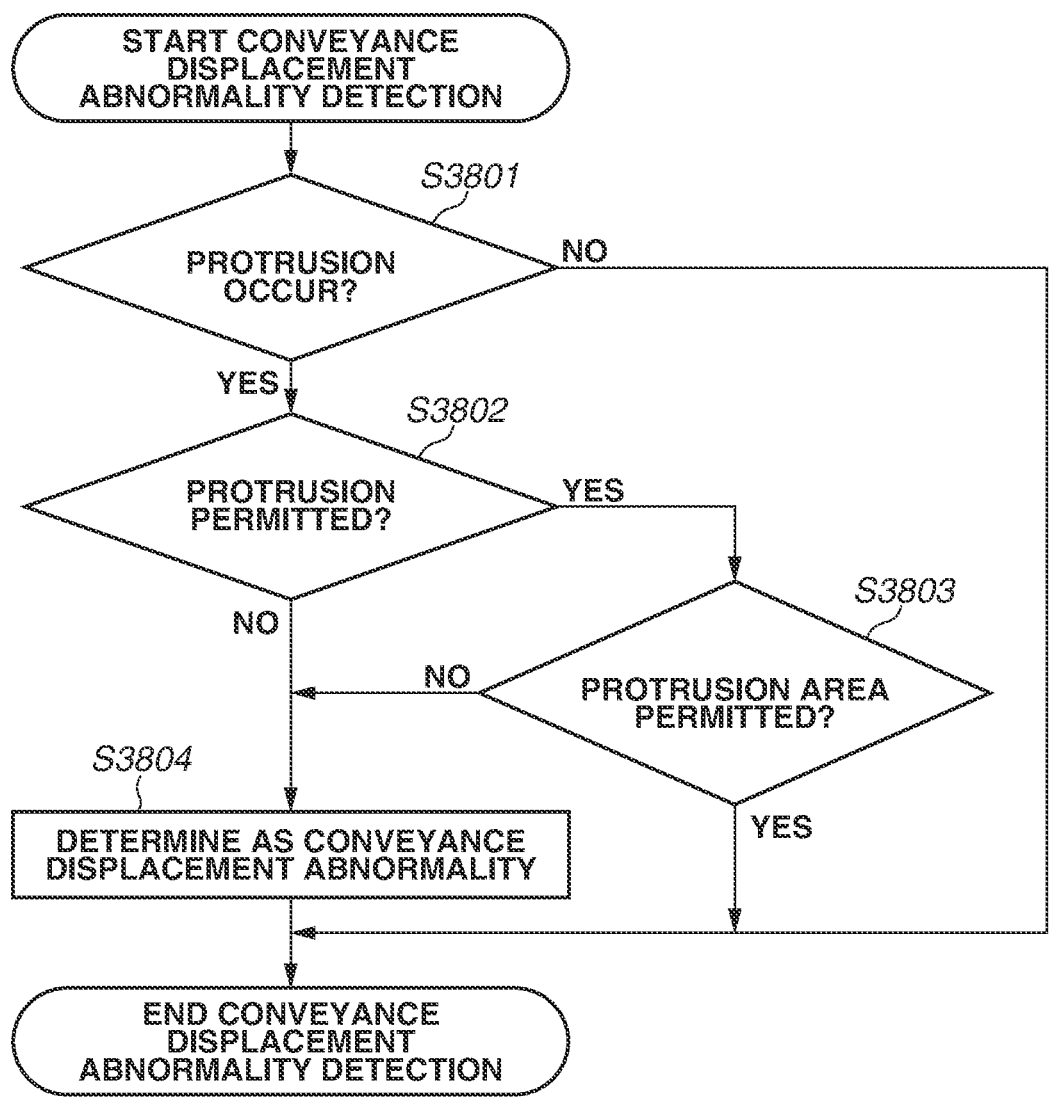
FIG. 15 is a flowchart of conveyance displacement abnormality detection processing according to one or more aspects of the presently disclosure.

In step S1008 according to the present exemplary embodiment, even in a case where protrusion is permitted, the protrusion detection unit 206 detects the conveyance displacement abnormality in a case where the protrusion area calculated in step S1007 is larger than the permissible area set in step S1003. The processing in step S1008 according to the present exemplary embodiment is now described using a flowchart illustrated in FIG. 15.

In step S3801, the conveyance displacement abnormality detection unit 208 first checks a result of the protrusion detection in step S1007. In a case where protrusion is detected (YES in step S3801), the processing proceeds to step S3802. In a case where protrusion is not detected (NO in step S3801), the conveyance displacement abnormality detection unit 208 determines that conveyance is normally performed and ends the processing.

In step S3802, in a case where protrusion is detected, the conveyance displacement abnormality detection unit 208 checks the permissible flag T0 set in step S1003. In a case where the setting is made to permit protrusion (T0=TRUE) (YES in step S3802), the processing proceeds to step S3803. In a case where the setting is made not to permit protrusion (T0=FALSE) (NO in step S3802), the processing proceeds to step S3804.

In step S3803, in a case where protrusion is permitted, the conveyance displacement abnormality detection unit 208 makes comparison between the permissible area T2 set in step S1003 and the protrusion area obtained in step S1007. In a case where the protrusion area is smaller than the permissible area T2 (YES in step S3803), the conveyance displacement abnormality detection unit 208 determines that conveyance is normally performed, and ends the processing. In a case where the protrusion area is larger than the permissible area T2 (NO in step S3803), the processing proceeds to step S3804.

In step S3804, since protrusion occurs despite the setting being made not to permit protrusion, or protrusion whose area cannot be permitted occurs while the setting is made to permit protrusion, the conveyance displacement abnormality detection unit 208 determines that the conveyance displacement abnormality has occurred, and ends the conveyance displacement abnormality detection processing.

In addition, the present exemplary embodiment uses both the permissible flag T0 and the permissible area T2 as thresholds, but may use only the permissible area T2 as a threshold. In this case, the permissible area T2 is obtained in step S1003 as follows.

$$T1 = \begin{cases} \dfrac{(p_w + 2R_{max} - s_w)p_h}{2} & (\text{if } p_w + 2R_{max} - s_w \geq 0) \\ 0 & (\text{if } p_w + 2R_{max} - s_w < 0) \end{cases} \quad \text{Expression (6)}$$

In a case where protrusion is detected in step S3801 in the conveyance displacement abnormality detection processing in step S1008, the processing proceeds to step S3803. In step S3803, the conveyance displacement abnormality detection unit 208 checks the protrusion area.

The processing described above enables detection of protrusion as abnormality depending on the protrusion area when the print product protrudes from the imaging range.

[Modification]

Figure 16:
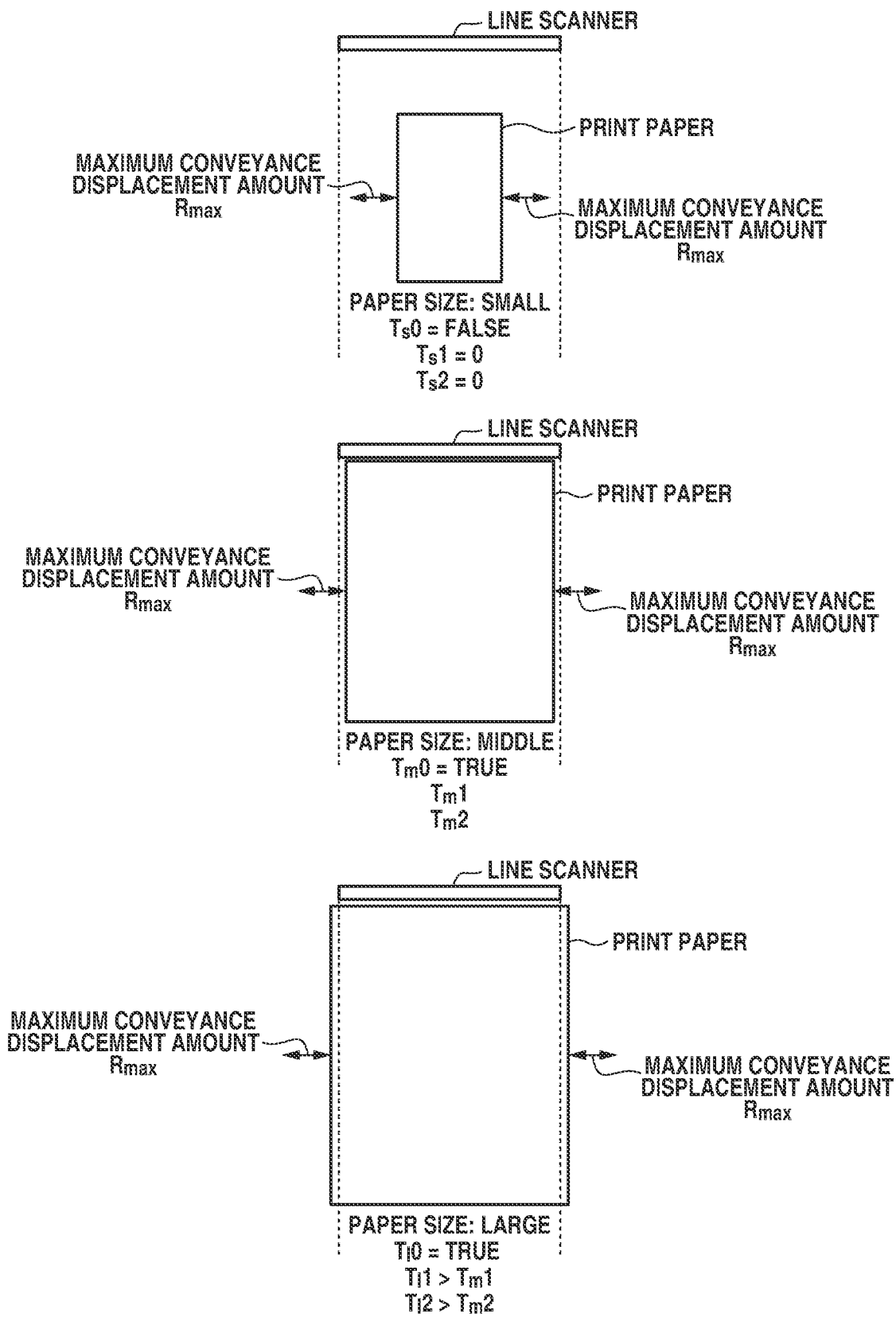
FIG. 16 is a diagram illustrating a relationship between a paper size and a likelihood of protrusion.

While the threshold is set based on the print setting and the apparatus information in the present exemplary embodiment, the threshold may be set based on only the print setting. As illustrated in FIG. 16, as the print paper size becomes larger, a possibility for protrusion becomes higher, the protrusion length becomes greater, and the protrusion area becomes larger. Thus, for example, a correspondence table between the print paper size and the threshold in which the threshold becomes larger as the print paper size becomes larger may be prepared in advance, and the threshold may be set based on the correspondence table.

While the threshold is set in step S1003 in the present exemplary embodiment, a threshold set by a user may be used. For example, the threshold set by the user via a UI panel 108 as illustrated in FIG. 17 may be used.

As the inspection region image data acquired in step S1005, data set by the user in advance may be used. For example, an inspection region set by the user based on the reference image data via the UI panel 108 serving as an inspection region setting unit may be used. As the threshold(s), only the permissible flag is set, either the permissible length or the permissible area is set in addition to the permissible flag, or both of the permissible length and the permissible area are set in addition to the permissible flag.

While the reference image created by scanning the print product with which no stain is visually confirmed in advance is used in the present exemplary embodiment, a reference image created by another method may be used. For example, corrected image data, which is obtained by applying correction on original data of the print product in consideration of characteristics of the image reading apparatus, may be used as the reference image data.

The present disclosure is not limited to the configurations directly described above, and may be implemented by combinations of elements and concepts described in each exemplary embodiment.

The present disclosures can be implemented also by executing the flowing processing. That is, the processing is executed such that software (a program) to implement the functions of the exemplary embodiments described above is supplied to a system or an apparatus via a network or a storage medium of various types, and a computer (or a CPU or a microprocessing unit (MPU)) of the system or the apparatus reads the program.

The present disclosure enables detection of protrusion desirably when the print product protrudes from the imaging range.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-186563, filed Nov. 9, 2020, which is hereby incorporated by reference herein in its entirety.

What is claimed is:

1. An image processing apparatus, comprising:
a print setting acquisition unit configured to acquire a print paper size;
a threshold setting unit configured to set, based on the print paper size, a threshold for a protruding portion of a print product, the protruding portion protruding from a reading range;
an image acquisition unit configured to acquire a scanned image of the print product;
a detection unit configured to detect the protruding portion from the scanned image; and
a conveyance displacement abnormality detection unit configured to detect conveyance displacement abnormality from the threshold and a result of the detection.

2. The image processing apparatus according to claim 1, further comprising an apparatus information acquisition unit configured to acquire apparatus information regarding a print apparatus and an inspection processing apparatus,
wherein the threshold setting unit is configured to set the threshold based on the apparatus information and the print paper size.

3. The image processing apparatus according to claim 2, wherein the apparatus information acquisition unit is configured to acquire at least one of an imaging range of an image reading apparatus or a maximum conveyance displacement amount on a conveying path as the apparatus information.

4. The image processing apparatus according to claim 2, further comprising an inspection region setting unit configured to set an inspection region as a target of the inspection,
wherein the inspection region setting unit is configured to set a region that does not protrude from an imaging range as the inspection region based on the print paper size and the apparatus information.

5. The image processing apparatus according to claim 1, wherein the threshold setting unit is configured to set a permissible flag indicating whether protrusion is permitted as the threshold, and
wherein, when protrusion is detected in a case where protrusion is not permitted, the conveyance displacement abnormality detection unit is configured to determine that the conveyance displacement abnormality has occurred based on the permissible flag and the result of the detection.

6. The image processing apparatus according to claim 5, wherein the threshold setting unit is configured to obtain a region of print paper that can be displaced when conveyed based on the print paper size, an imaging range of an image reading apparatus, and a maximum conveyance displacement amount on a conveying path, and set the permissible flag using the region of the print paper that can be displaced when conveyed.

7. The image processing apparatus according to claim 1,
wherein the threshold setting unit is configured to set a permissible length at which protrusion is permitted as the threshold, and
wherein the conveyance displacement abnormality detection unit is configured to determine that the conveyance displacement abnormality has occurred in a case where a protrusion length becomes greater than the permissible length based on the result of the detection and the permissible length.

8. The image processing apparatus according to claim 7,
wherein the threshold setting unit is configured to obtain a region of print paper that can be displaced when conveyed based on the print paper size, an imaging range of an image reading apparatus, and a maximum conveyance displacement amount on a conveying path, and set the permissible length using the region of the print paper that can be displaced when conveyed.

9. The image processing apparatus according to claim 1,
wherein the threshold setting unit is configured to set a permissible area where protrusion is permitted as the threshold, and
wherein the conveyance displacement abnormality detection unit is configured to determine that the conveyance displacement abnormality has occurred in a case where a protrusion area becomes larger than the permissible area based on the result of the detection and the permissible area.

10. The image processing apparatus according to claim 9,
wherein the threshold setting unit is configured to obtain a region of print paper that can be displaced when conveyed based on the print paper size, an imaging range of an image reading apparatus, and a maximum conveyance displacement amount on a conveying path, and set the permissible area based on the region of the print paper that can be displaced when conveyed.

11. The image processing apparatus according to claim 1,
further comprising an inspection unit configured to inspect the scanned image of the print product,
wherein, in a case where the conveyance displacement abnormality detection unit detects no conveyance displacement abnormality, the inspection unit is configured to inspect the scanned image of the print product.

12. The image processing apparatus according to claim 11, further comprising a reference image data acquisition unit configured to acquire reference image data,
wherein the inspection unit is configured to perform the inspection by comparing a reference image and the scanned image of the print product.

13. The image processing apparatus according to claim 11, further comprising an inspection region setting unit configured to set an inspection region as a target of the inspection,
wherein the inspection unit is configured to inspect the inspection region.

14. A non-transitory computer-readable storage medium storing instructions that, when executed by a computer, cause the computer to perform a method comprising:
performing print setting acquisition to acquire a print paper size;
setting, based on the print paper size, a threshold for a protruding portion of a print product, the protruding portion protruding from a reading range;
performing image acquisition to acquire a scanned image of the print product;
detecting the protruding portion from the scanned image; and
detecting conveyance displacement abnormality from the threshold and a result of the detection.

15. An image processing method, comprising:
performing print setting acquisition to acquire a print paper size;
setting, based on the print paper size, a threshold for a protruding portion of a print product, the protruding portion protruding from a reading range;
performing image acquisition to acquire a scanned image of the print product;
detecting the protruding portion from the scanned image; and
detecting conveyance displacement abnormality from the threshold and a result of the detection.

* * * * *